(No Model.)  2 Sheets—Sheet 1.
I. T. HARDY.
TOBACCO PACKING MACHINE.
No. 452,703.  Patented May 19, 1891.
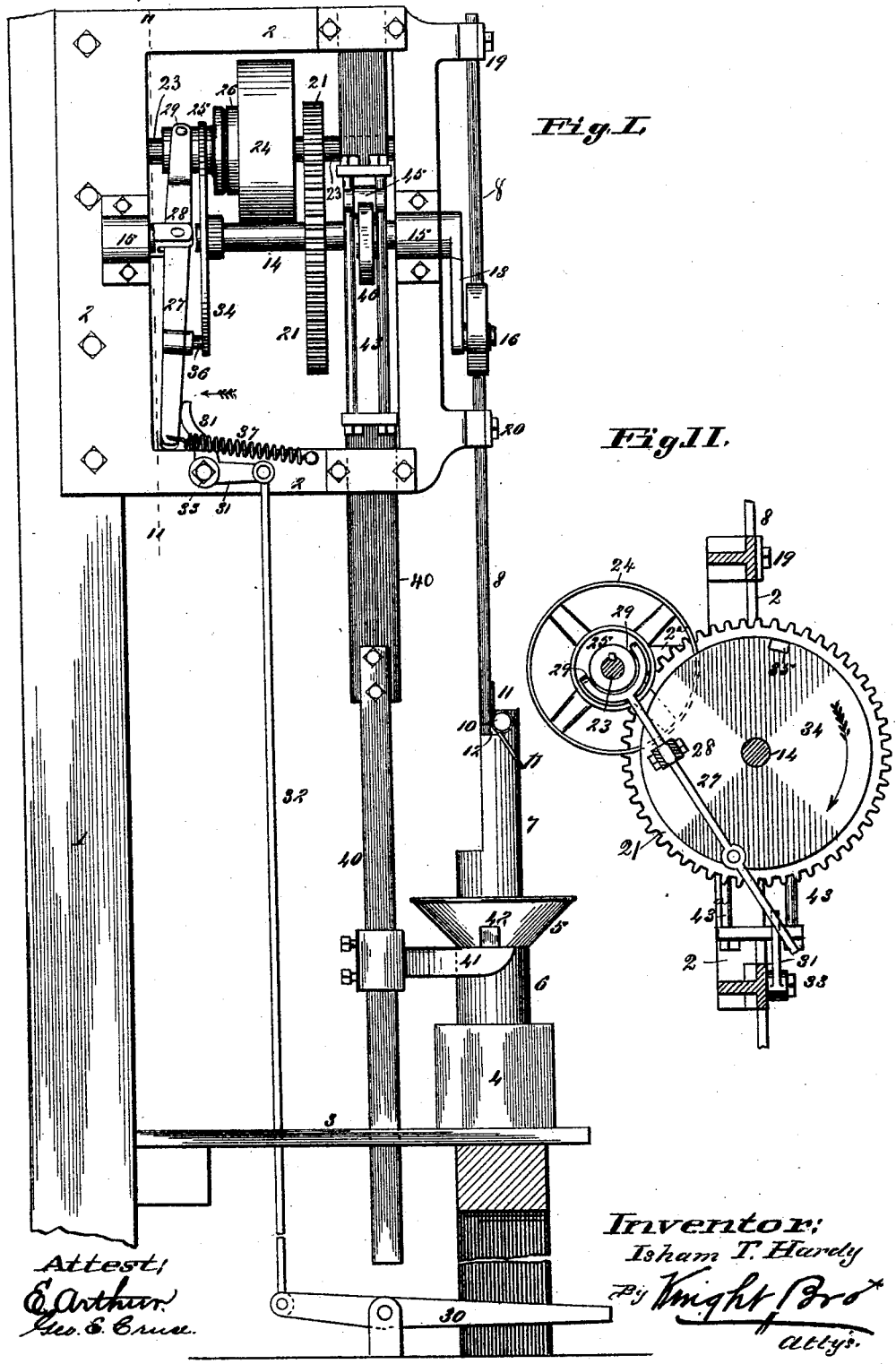
Fig. I.
Fig. II.
Attest:
E. Arthur
Geo. E. Cruse
Inventor:
Isham T. Hardy
By Knight Bro
attys.

(No Model.)  2 Sheets—Sheet 2.
I. T. HARDY.
TOBACCO PACKING MACHINE.
No. 452,703. Patented May 19, 1891.
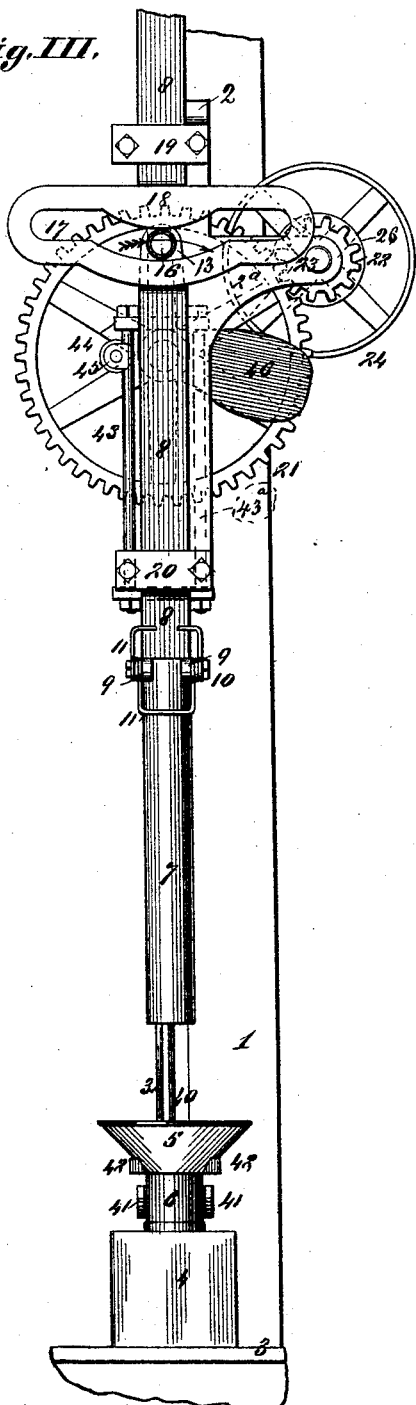
Fig. III.
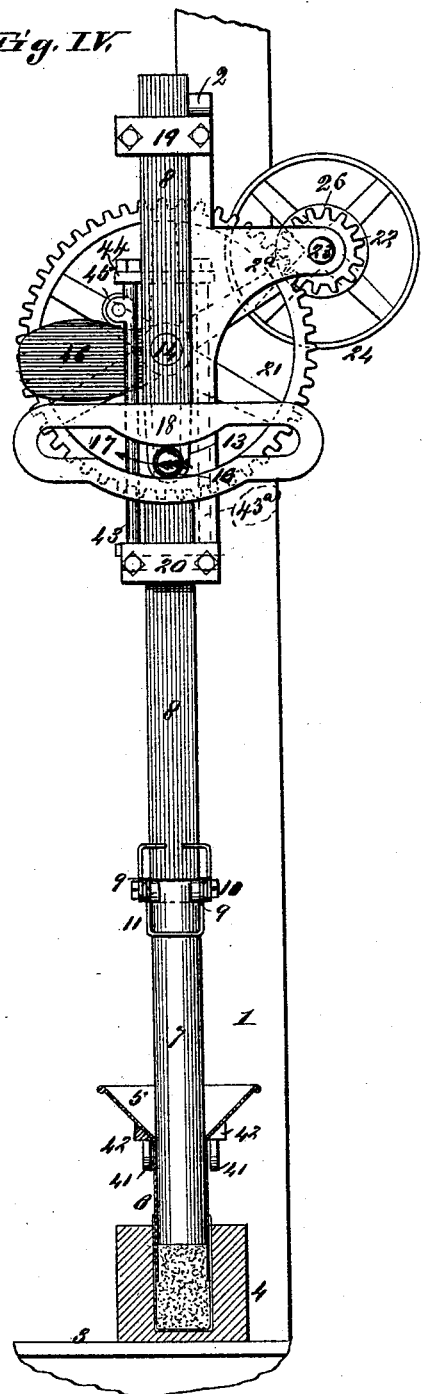
Fig. IV.
Attest:
E. Arthur
Geo. E. Cruse
Inventor:
Isham T. Hardy
By Knight Bros
Attys

UNITED STATES PATENT OFFICE.

ISHAM T. HARDY, OF ST. LOUIS, MISSOURI, ASSIGNOR TO THE CATLIN TOBACCO COMPANY, OF MISSOURI.

TOBACCO-PACKING MACHINE.

SPECIFICATION forming part of Letters Patent No. 452,703, dated May 19, 1891.

Application filed March 25, 1890. Serial No. 345,256. (No model.)

*To all whom it may concern:*

Be it known that I, ISHAM T. HARDY, of the city of St. Louis, in the State of Missouri, have invented a certain new and useful Improvement in Tobacco-Packing Machines, of which the following is a full, clear, and exact description, reference being had to the accompanying drawings, forming part of this specification.

My invention relates to certain improvements in machines for automatically filling sacks or bags with cut tobacco; and my invention consists in features of novelty hereinafter fully described, and pointed out in the claims.

Fig. I is a side elevation of my improved machine, partly broken away. Fig. II is a detail vertical section taken on line II II, Fig. I. Fig. III is a front elevation showing the plunger in its raised or upper position. Fig. IV is a similar view showing the plunger in its lower position, and showing the sack-mold or the receiver and the filling tube or neck in section.

Referring to the drawings, 1 represents a suitable support, to which is secured a frame 2.

3 represents a table extending from the support 1, and upon which rests a mold or sack-receiver 4, having a central opening, as shown in Fig. IV. Over the mold is arranged a hopper 5, having a tube or hollow neck 6 extending down a distance into the mold, as shown in Fig. IV.

7 represents a plunger secured to the lower end of a pitman 8. A hinged connection is preferably made between the plunger and pitman by forming ears 9 on the pitman, between which the upper end of the plunger fits, and through which a connecting-bolt 10 passes, the bolt also passing through the upper end of the plunger.

11 represents a spring coiled around the extended ends of the bolt 10, and above and below which it extends. The upper end of the spring bears against the pitman 8 and the lower end bears against the plunger 7. (See Figs. I, III, and IV.) The tendency of this spring is to hold the plunger in line with the pitman, the lower end of the pitman resting on a shoulder 12 on the plunger. (See Fig. I.) It will thus be seen that as the pitman is moved up and down it will impart a vertical reciprocation to the plunger, while at the same time the plunger can be swung out of a vertical line or out of a line parallel with the pitman for the purpose of cleaning it or for the purpose of getting it from over the hopper when desired, and when it is released the spring will automatically move it back into its vertical or working position.

13 represents a crank on the end of a shaft 14, journaled by means of suitable boxes 15 to the frame 2. This crank is provided with a wrist-pin 16, fitting in a slot 17 of a cross-head 18, permanently connected to the pitman 8, and above which the pitman extends to and works through a guide 19 on the frame 2, by which, in connection with the guide 20 at the lower end of the frame 2, the pitman is held and caused to move in a vertical plane. The slot 17 in the head 18 is made horizontal at its ends, as shown in Figs. III and IV, while its central portion is made in the arc of a circle, so that as the crank 13 is turned the pitman will be raised and lowered and will have a rest or stop at the limit of each of its movements, while the wrist-pin is traveling through the portion of the slot 17 which is made in the arc of a circle, thus giving time while the plunger is in its lower position for the compressed tobacco to remain under the pressure for a sufficient period of time to cause it to be firmly packed in the sack, and giving time for the hopper to be lifted, as hereinafter explained.

The shaft 14 is connected by a cog-wheel 21 and a pinion 22 to a power-shaft 23, journaled in extensions 2ᵃ of the frame 2. The shaft 23 is provided with a driving-pulley 24 to receive a belt, by which motion is imparted to the machine. The driving-pulley is loosely mounted on the shaft 23, and is connected thereto automatically by means of a sliding member 25 of a clutch, which is caused by having a feather-and-groove or other suitable connection with the shaft (see Fig. II) to turn therewith. The inner face of the sliding member 25 is adapted to have frictional contact with the hub 26 on the pulley (see Fig. I) when it is moved over against the hub, and thus causes the pulley to be turned with the sliding member and with the shaft. The sliding member is moved by means of a suitable lever 27, pivoted at 28 to the frame 2, the upper end of the lever being bifurcated, as shown in Fig. II, and provided with pins 29, fitting in an annular groove in the sliding member, so as not to interfere with the turning of the sliding member with the shaft while forming a connection between the lever and sliding member, which will cause the latter to be moved longitudinally on the shaft.

The lever 27 is moved to bring the sliding member of the clutch into contact with the fixed member or hub 26 by means of a treadle 30, a bell-crank lever 31, and a connecting-rod 32. The bell-crank lever 31 is pivoted at 33 to the frame 2, with its upper end bearing against the lower end of the lever 27, while to its lower end the upper end of the rod 32 is connected. It will be seen that by applying pressure to the outer end of the treadle 30 that the upper end of the bell-crank lever will be forced in the direction indicated by the arrow, Fig. I, causing the upper end of the lever 27 to be forced toward the pulley 24, and consequently causing the sliding member of the clutch to be brought up against the hub 26, causing the shaft 23 to be turned with the pulley, which is driven continuously, and causing also the shaft 14 to be driven through means of the connecting-gears 21 22. On the shaft 14 is permanently secured a disk 34, having a notch or opening 35. (See Figs. I and II.) As the sliding member of the clutch is thrown into frictional contact with the hub 26 of the pulley 24 a pin or projection 36 on the lever 27 is disengaged from the notch 35 of the disk 34, and as soon as the machine starts the pressure is removed from the treadle 30, the sliding member of the clutch being held into contact with the hub 26 by the pin 36 riding on the face of the disk 34 until the pin 36 comes opposite the opening 35 of the disk 34, and then the lower end of the lever 27 is pulled by a spring 37 toward the disk, causing the pin to enter the opening 35 to stop the rotation of the shaft 14, and at the same time the movable member of the clutch is carried out of contact with the hub 26, so that the rotation of the shaft 23 also ceases. The parts are so disposed that while the pin 36 is riding on the disk 34 the plunger 7 is making a complete movement from its upper position to its lower position and back again to its upper position, and when it has completed this movement it is automatically stopped or retained at its upper position until the treadle 30 is again operated to move the pin 36 out of engagement with the perforation 35 and the movable member of the clutch into engagement with the hub 26 of the pulley 24. The neck or tube of the hopper fits loosely in the mold 4, so as to be capable of movement therein. Before starting the machine a sack is placed on the mold beneath the tube or neck of the funnel and the tobacco is placed in the funnel. The plunger then descends, forcing the sack into the mold and forcing the tobacco from the funnel into the sack, as shown in Fig. IV, the neck or tube of the funnel at the same time being forced a distance into the mold inside of the sack, so as to hold the sides of the sack taut while the tobacco is being compressed. Before the plunger commences to make its upward movement the funnel is raised to lift its tube or neck out of the mold by means of a vertical strip or plate 40, having adjustable horizontal arms 41, which embrace the neck or tube of the funnel, and which bear beneath projections or lugs 42 on the funnel, as shown in Figs. I, III, and IV. The upper end of the strip or plate 40 is connected by means of rods 43 43$^a$ to a cross-head 44, located just over the shaft 14. The rods 43 43$^a$ are located on each side of the shaft 14, (a pair of them being on each side,) and to one pair 43 of these rods is journaled a roller 45, against which at the proper time a cam 46 on the shaft 14 bears to lift the plate or strip 40, and consequently the neck of the funnel, out of the mold. The funnel being raised from the mold while the plunger is still in its lower position prevents the tobacco being raised from the sack by the funnel, and after the funnel has made this upward movement the plunger recedes, and before the plunger descends again the cam 46 has left the roller 45, permitting the plate 40 and the funnel 5, with its neck 6, to recede to their lower position, the filled sack having been removed and a fresh sack placed over the mold before the hopper recedes or is forced to its lower position.

I claim as my invention—

1. The combination of a pitman formed with ears at the lower end, a plunger having a shoulder, the bolt by which the plunger is hinged to the ears of the pitman, and a spring coiled around the extended ends of the bolt and bearing on the pitman and on the plunger, substantially as described.

2. The combination of a frame, a shaft journaled in the frame having a cam, a pitman, mechanism connecting the pitman with the shaft, a plunger connected with the pitman, a hopper surrounding the plunger having projections, an upwardly-extending plate, arms secured to the plate for engaging the projections on the hopper, paired rods secured to the upper end of the plate, a pair being located on each side of the shaft, the cross-head secured to the rods over the shaft, and a roller journaled to one pair of the rods and on which the cam bears to lift the plate, substantially as described.

ISHAM T. HARDY.

In presence of—
 E. S. KNIGHT,
 THOS. KNIGHT.